Oct. 15, 1946.                J. MESSANA, JR                    2,409,299
                    GROOVE-FORMING ATTACHMENT FOR MACHINE TOOLS
                         Filed May 16, 1944          3 Sheets-Sheet 1
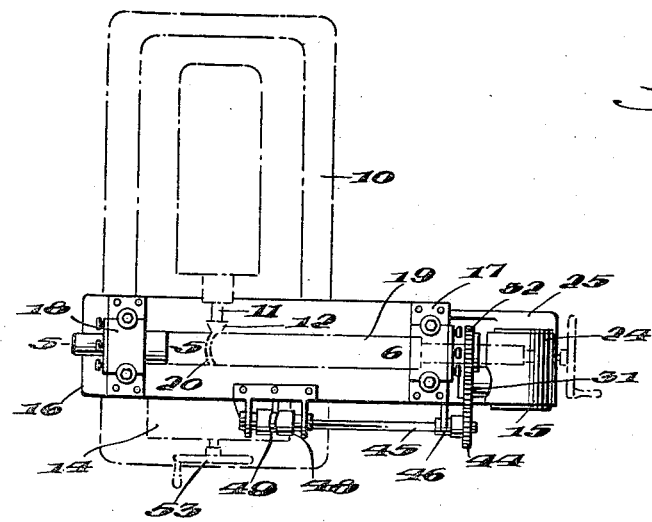
Inventor
Joseph Messana, Jr.
Attorney

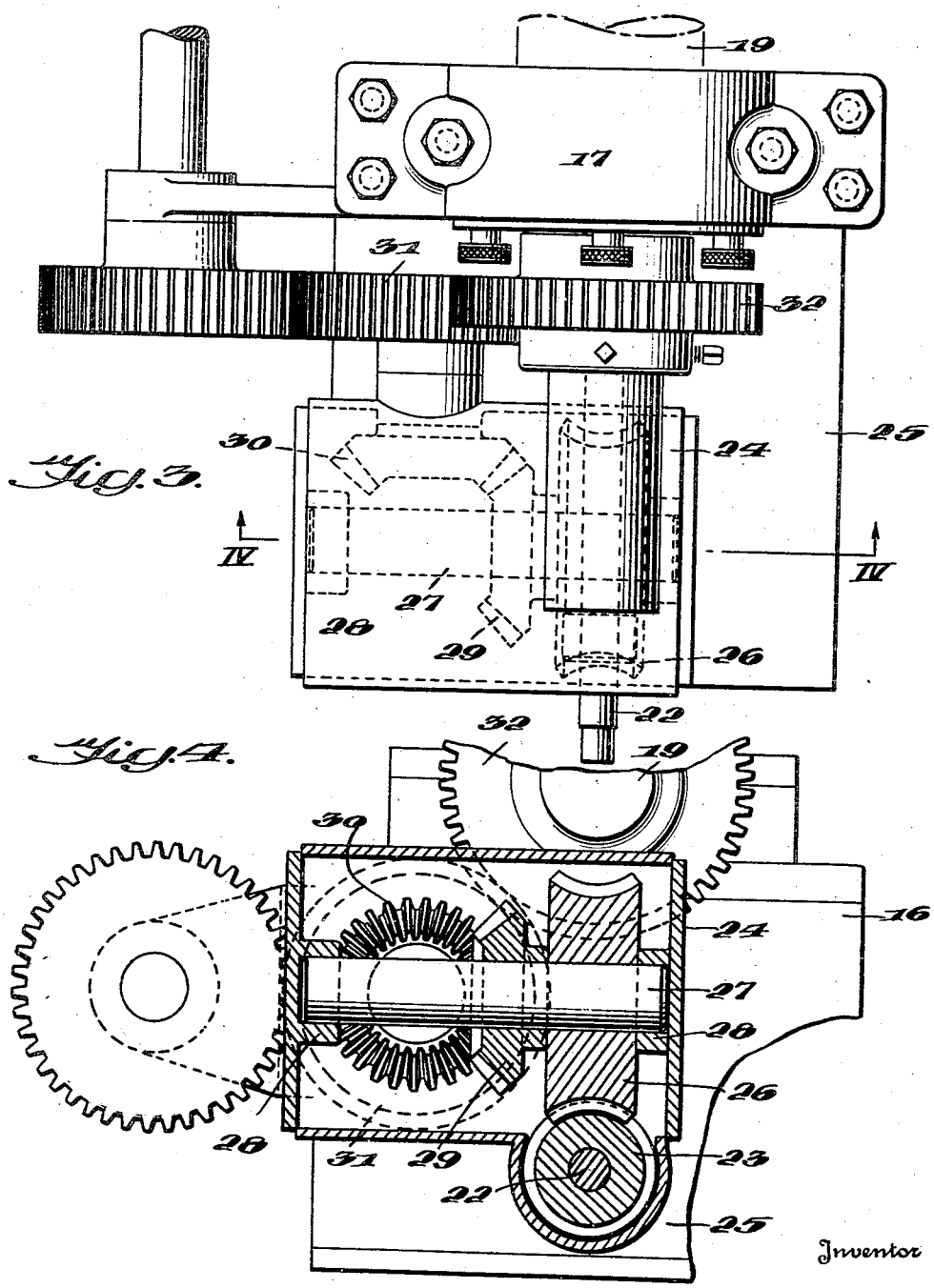

Oct. 15, 1946.   J. MESSANA, JR   2,409,299
GROOVE-FORMING ATTACHMENT FOR MACHINE TOOLS
Filed May 16, 1944   3 Sheets-Sheet 3
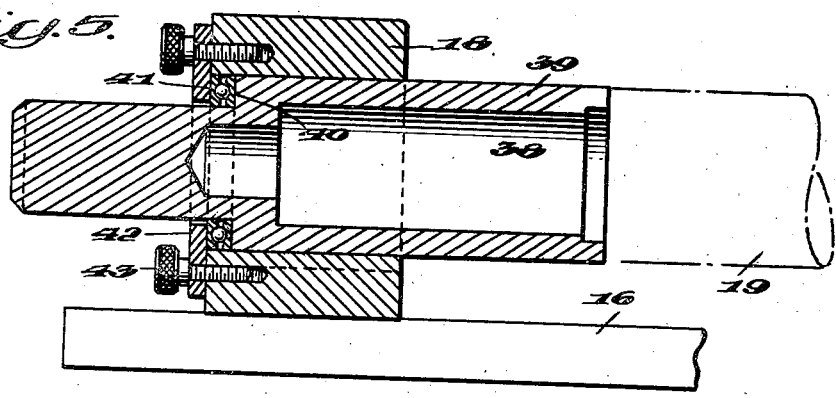
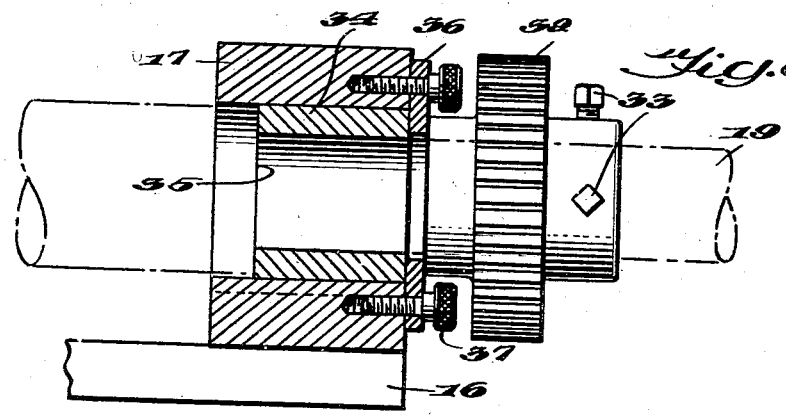
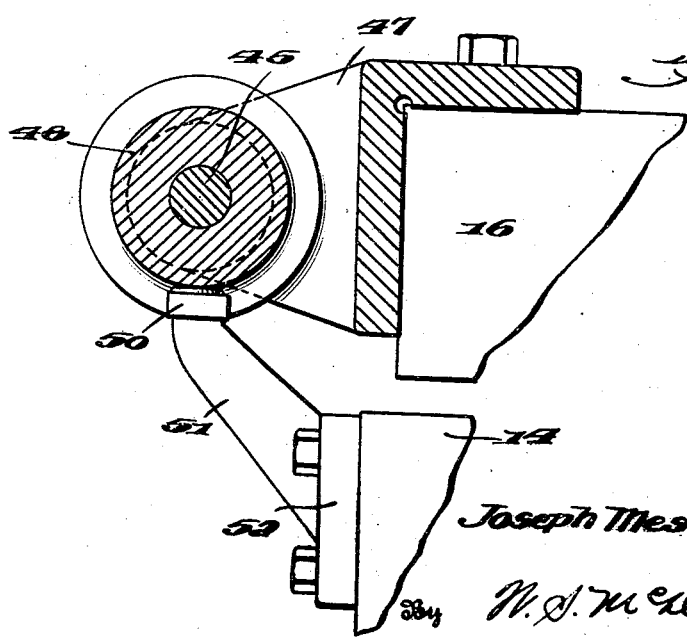
Inventor
Joseph Messana, Jr.
By N. S. McDowell
Attorney Patented Oct. 15, 1946

2,409,299

UNITED STATES PATENT OFFICE 2,409,299

GROOVE-FORMING ATTACHMENT FOR MACHINE TOOLS

Joseph Messana, Jr., Columbus, Ohio, assignor to The Jaeger Machine Company, Columbus, Ohio, a corporation of Ohio Application May 16, 1944, Serial No. 535,860

3 Claims. (Cl. 90—11.50)

This invention relates generally to metal cutting and machining, and in its more specific aspects is concerned with shaft grooving or threading attachment for machine tools such as milling machines.

In producing crossed and intersected helical guide grooves in a shaft adapted for the reception of a follower which, upon rotation of the shaft, moves longitudinally thereof, first in one direction and then in the other, considerable time and labor is required in the operation of completing or joining the adjacent ends of the crossed grooves at their positions of longitudinal termination in the shaft. Standard grooving or thread cutting machines are available for forming such grooves throughout their full lengths in a shaft, but the machine tool industry, so far as I am aware, provides nothing in the way of a special tool, machine or attachment which will complete the grooves at the ends of the shaft by cutting the latter to join the contiguous ends of said grooves. As a result, the completion of the grooves is now largely a hand operation, which is unduly costly and laborious and is often improperly carried out so that defective workmanship results.

Shafts so grooved are employed in level winders, the latter being used in the spooling or unspooling of cables or lines on drums, hoists, windlasses or reels of various types and uses. The follower of the level winder travels back and forth on a rotating shaft in order that the cable or line, passing through the follower and guided thereby, may be wound or unwound in a flat uniform manner on or from the associated drum or reel, hence the movement of the follower longitudinally in one direction on the shaft and its automatic reversal to travel longitudinally in the opposite direction. In this connection, the movement of the follower is obtained by the crossed or intersecting helical grooves which have their contiguous ends united to form a continuous or spiral helical guide groove.

It is, therefore, the object of the present invention to provide a simple and improved attachment for milling machines, or other similar machine tools, by which the end or completing grooves may be cut in the follower shaft of a level winder in an accurate, rapid and virtually automatic manner, thereby reducing substantially the present costs of such operations, speeding the output of the work and, even more important, obtaining machine accuracy in the operation which present hand cutting methods fail to provide.

For a further understanding of the invention, reference is to be had to the following description and the accompanying drawings wherein:

Fig. 1 is a front elevational view of a milling machine provided with the groove-cutting attachment constituting the present invention;

Fig. 2 is a top plan view thereof;

Fig. 3 is a fragmentary top plan view disclosing the power-transmitting gearing employed by my attachment;

Fig. 4 is a vertical transverse sectional view taken on the plane disclosed by the line IV—IV of Fig. 3;

Fig. 5 is a detail vertical longitudinal sectional view taken through the tail stop bearing of my improved attachment;

Fig. 6 is a similar view through the head stop bearing;

Fig. 7 is a vertical sectional view on the plane indicated by the line VII—VII of Fig. 1;

Fig. 8 is a side elevational view of a shaft having grooves cut therein in accordance with the present invention.

Referring more particularly to the drawings, and to a consideration of the detailed construction of one of the practical structural embodiments of my invention, the numeral 10 designates a standard milling machine, the same being formed to provide a driven horizontal shaft 11 on one end of which is mounted a rotary end milling tool 12. The frame of the milling machine carries the usual vertical adjustable knee 13 on which is mounted a longitudinally adjustable saddle section 14. Upon such a machine, I mount my improved grooving attachment, which is indicated generally by the numeral 15.

The attachment comprises a table 16, which is adapted to be mounted for limiting sliding movement on the upper surface of the saddle section 14 of the milling machine. The table has mounted on the top thereof a head stock bearing 17 and a longitudinally spaced tail stock bearing 18, which receive and rotatably support a shaft 19, or other cylindrical work piece, in which grooves are to be cut. My improved attachment provides power means for rotating the work piece and for moving the same longitudinally relative to the cutting tool 12 of the milling machine, whereby to form a helical groove 20 which unites the adjacent ends of the crossed or intersecting grooves 21 produced in said shaft through other cutting means.

These operations are accomplished by providing the milling machine with an extended shaft 22 suitably driven by the usual power gearing of the milling machine. The outer end of this shaft drives a worm 23 which is disposed in a housing 24, the latter, in turn, being supported by a bracket 25 connected with the table 16. The worm 23 drives a worm gear 26 which is fixed to a shaft 27, which has its ends journaled in bearings 28 formed with the walls of the housing 24. Also driven by the shaft 27 is a bevel gear 29 which meshes with a similar gear 30 arranged within the housing 24. The shaft on which the gear 30 is fixed carries a cog gear 31, the teeth of which mesh with a corresponding gear 32 which, through the use of set screws 33, is adapted to be detachably secured to the reduced end of the work shaft 19 projecting beyond the head stock bearing 17. The head stock bearing is provided with a bearing sleeve 34, one end of the latter engaging the annularly shouldered surface 35 of the work shaft, while the opposite end of the sleeve is held by a retaining ring 36 within the confines of the bearing 17, the ring being clamped in place by means of removable screws 37.

The opposite end of the work shaft is received in a longitudinal socket 38 provided in a tail stock spindle 39. This spindle is formed with an annular shoulder 40 which engages with a thrust bearing 41, said bearing being retained within the confines of the bearing boxing 18 by means of a ring member 42 which is fastened in place by removable screws 43. Thus, when the shaft 22 is driven, rotation of the shaft 19 will take place about its longitudinal axis, bringing different portions of the shaft into engagement with the cutting tool 12.

In order that the grooves 20 cut by the tool 12 may be of correct curvature, the table 16 is shifted longitudinally during the groove-cutting operation. Such shifting is accomplished by the provision of a cog gear 44 which is fixed to one end of a shaft 45 and disposed in meshing engagement with the cog gear 31. The shaft 45 is mounted in bracket bearings 46 and 47 carried by the bed member 16. Within the confines of the bearing 47, the shaft 45 has fixed thereto a cylindrical member 48, and in the outer wall of this member there is provided an irregular groove 49 which possesses a formation desired to be imparted to the grooves 20.

Positioned in the groove 49 is a roller 50 which is secured to the upper end of an arm 51 of a bracket 52, the latter being fastened to the saddle section 14 of the milling machine. It will be evident that as the shaft 45 rotates, revolving with it the cylindrical member 48, the groove provided in said member through its engagement with a fixed roller 50, will cause the table 16 to move longitudinally of itself past the cutter 12 in accordance with the shape or contour of the groove 49. Corresponding movement is, of course, imparted to the work shaft 19, thus producing in said last-named shaft the end grooves 20 and causing the same to unite with the crossed grooves 21. The saddle section 14 is provided with the usual mounting for longitudinal adjustment on the knee 13 in order, by the actuation of the manual control 53, to bring the work shaft 19 into cutting engagement with the cutter 12 and to regulate, as usual, the depth of the cut produced in the work. The upper surface of the saddle section 14 may be provided with longitudinal slots for the reception of guide gibs 54 employed in slidably positioning the table 16 on said saddle section. The entire bed structure may be raised or lowered by the use of the customary jack mechanism indicated generally at 55 and which is mounted in the stationary frame of the milling machine.

When the attachment is not in use, it may be readily removed from the knee of the milling machine, leaving the latter free to perform other operations. While I have referred to my improvement as an attachment for machine tools, it will be obvious that the same may be embodied in a special machine devoted solely to the operation. However, from a practical standpoint, the attachment form of my improvement is ordinarily more economical in machine shop practice than a complete machine tool.

Having thus described my invention, I claim:

1. A groove-forming attachment for milling machines of the type embodying a frame, a vertically adjustable knee and a rotary end-cutting tool, said attachment comprising a saddle section movably supported on said knee for longitudinal adjustment in a direction parallel to the principal axis of the cutting tool, a table mounted on said saddle section for bodily movement in unison therewith toward and away from said tool and for sliding movement relative to said saddle section in directions substantially at right angles to the axis of said cutting tool, spaced bearings provided on said table for the rotatable reception of a cylindrical work piece in which end grooves are to be cut, said end grooves being substantially elliptical in outline when the work piece is viewed in elevation and being employed to unite the ends of relatively intersecting helical grooves produced in said work piece, motion-transmitting gearing on said table for imparting rotation to said work piece about its longitudinal axis, a forming member rotatably mounted on said table, said forming member having a groove formed therein corresponding in configuration to the end grooves to be cut in said work piece, means driven by said gearing for rotating said forming member in synchronism with the rotation of the work piece, and a fixed arm mounted on said saddle section and engageable with the groove in said forming member, whereby rotation of said forming member serves to impart regulated longitudinal movement to said table and the work piece thereon during rotation of said work piece and while same is in engagement with said cutting tool.

2. In a milling machine, a stationary frame, a rotary end-cutting tool supported by said frame, said tool occupying a fixed position of operation with respect to said frame, a knee member adjustable vertically of said frame beneath said cutting tool, a saddle section mounted on said knee member for longitudinal adjustment in a direction substantially parallel to the principal axis of the cutting tool, a table mounted on said saddle section for bodily movement in unison therewith toward and away from said cutting tool and for sliding movement relative to said saddle section in a direction substantially at right angles to the axis of said cutting tool, a power-driven shaft projecting from said frame, gearing mounted on one end of said table and driven by said drive shaft, spaced bearings provided on said table for the rotatable reception of a work shaft, drive means removably connected with said work shaft and cooperative with said gearing for rotating said work shaft about its longitudinal axis, a cylindrical forming member mounted for rotation on said table, said forming member having an irregularly shaped guide provided thereon which possesses the configuration of an irregularly shaped groove desired to be cut in said work shaft, the said groove being substantially elliptical in outline when the work shaft is viewed in elevation and being employed to unite the ends of relatively intersecting helical grooves formed in the work shaft, means driven by said gearing for rotating said forming member in unison with said work shaft, and a relatively stationary member carried by said saddle section and having an end thereof engaged with the guide of said forming member to impart regulated longitudinal movement to said table and the work shaft thereon during rotation of said work shaft and while the same is in engagement with said cutting tool.

3. In a milling machine as specified in claim 2 and wherein the end of the relatively stationary member engaged with the guide of the forming member is provided with a turnable friction-reducing element.

JOSEPH MESSANA, Jr.